United States Patent [19]
Yoshimura et al.

[11] Patent Number: 5,524,000
[45] Date of Patent: Jun. 4, 1996

[54] TERMINAL UNIT AND A TERMINAL UNIT CONNECTING METHOD IN ATM SWITCHING SYSTEM

[75] Inventors: Shuji Yoshimura; Satoshi Kakuma; Shiro Uriu, all of Kawasaki, Japan

[73] Assignee: Fujitsu Limited, Kawasaki, Japan

[21] Appl. No.: 87,286

[22] Filed: Jul. 8, 1993

[30] Foreign Application Priority Data

Jul. 8, 1992 [JP] Japan ..................................... 4-181275

[51] Int. Cl.$^6$ .......................... H04L 12/56; H04L 12/433
[52] U.S. Cl. .................. 370/60.100; 370/85.500
[58] Field of Search ........................... 370/60.1, 60, 94.1, 370/85.1, 85.4, 85.5, 85.12, 85.14, 85.15, 85.13; 340/825.05

[56] References Cited

U.S. PATENT DOCUMENTS

| | | | |
|---|---|---|---|
| 4,949,083 | 8/1990 | Hirabayashi et al. | 370/85.500 |
| 5,087,911 | 2/1992 | Green et al. | 370/85.150 |
| 5,285,448 | 2/1994 | Nakayama et al. | 370/85.500 |

*Primary Examiner*—Douglas W. Olms
*Assistant Examiner*—Dang Ton
*Attorney, Agent, or Firm*—Staas & Halsey

[57] ABSTRACT

A first terminal unit is connected to a line switch via a set of data lines. A second terminal unit is connected to the first terminal unit via a set of data lines. A third terminal unit is connected to the second terminal unit via a set of data lines. Therefore, the terminals are sequentially connected in series. Cells transmitted to the terminals are multiplexed by each terminal and sequentially transmitted upstream, to the third terminal unit, the second terminal unit, and the first terminal unit together with a token. Since the first terminal unit receives a first identification signal from a switch and a second identification signal from downstream, the first terminal unit recognizes that it is the highest order terminal unit, and sends a cell to the switch after separating the cell from a token which is to be returned downstream. Since the second terminal unit does not receive the first identification signal and receives only the second identification signal, it recognizes that it is an intermediate terminal unit, and sends back downstream a token returned from upstream. Since the third terminal unit does not receive the identification signals, it recognizes that it is the lowest order terminal unit, and sends upstream a cell transmitted via a low data rate line according to a token returned from upstream.

14 Claims, 12 Drawing Sheets

| SDX | SDY | DETERMINATION | SELECTOR A | SELECTOR B |
|---|---|---|---|---|
| ON | ON | HIGHEST ORDER TERMINAL UNIT, CONNECTED TO SWITCH SW, WITH DOWNSTREAM TERMINAL UNIT | SELECTING TOKEN TK-4 FROM DOWNSTREAM AND OUTPUTTING IT | RETURNING ITS OWN TOKEN TK-2 AS TK-1 DOWNSTREAM |
| ON | OFF | ONLY TERMINAL UNIT | SELECTING AND OUTPUTTING ITS OWN TOKEN TK 2 | NO ACTION |
| OFF | ON | INTERMEDIATE TERMINAL UNIT | SELECTING TOKEN TK 4 FROM DOWNSTREAM AND OUTPUTTING IT | RETURNING TOKEN DOWNSTREAM TOKEN TK-1 RETURNED FROM UPSTREAM |
| OFF | OFF | LOWEST ORDER TERMINAL UNIT (TOKEN MASTER) | SELECTING TOKEN TK-1 RETURNED FROM UPSTREAM AND OUTPUTTING IT | NO ACTION |

FIG. 10

TERMINAL UNIT AND A TERMINAL UNIT CONNECTING METHOD IN ATM SWITCHING SYSTEM

BACKGROUND OF THE INVENTION

1. Field of the Invention

The present invention relates to a terminal unit and a method of connecting terminal units in an ATM switching system.

2. Description of the Related Art

Recently, high data rate communication networks such as a B-ISDN (Broadband Integrated Services Digital Network) for transmitting various types of communication data have been put to practical use. The network transmits data at an extremely high data rate of about 1.2 G bit/s (gigabits/second). An ATM (Asynchronous Transfer Mode) system has already been developed for putting faculty of much high data rate transmission to practical use. The MSSR (Multi-Stage-Self-Routing) switching method used in the ATM system comprises a switch (inter-network connection relay line switch) for switching lines from a high data rate communication network and terminal units (trunks), connected to the high data rate communication network (relay line), for terminating the high data rate communication network.

Generally, a plurality of terminal units are serially connected to one switch as shown in FIG. 1. An ATM cell (a 32–128 byte fixed-length signal block comprising a header and an information field containing quantized data) is transmitted at data rate of 1.2 G bit/s through the high data rate lines connecting terminal units 81, 82 and 83 to each other, and connecting terminal unit 83 to a switch unit.

Low data rate lines capable of processing data at, for example, 1.5 M (mega), 2 M, and 150 Mbit/s, etc. are connected to each of the terminal units 81, 82, or 83. Each terminal unit receives necessary cells through the high data rate lines, and distributes and transmits the cells to the low data rate lines at a data rate depending on the capabilities of the low data rate lines connected to the terminal unit. Each terminal unit also multiplexes cells transmitted through the low data rate lines and transmits them to a broadband communication network, etc. through the high data rate lines through the switch.

The functions of the terminal units can be performed using a token cycling through a plurality of serially connected terminals and a buffer temporarily storing a plurality of cells provided in a multiplexing circuit of each terminal unit. That is, when data are transmitted from the low data rate lines to the high data rate lines, terminal unit 81, 82, or 83 has the right to transmit its own cells if it has obtained the token. For example, if the terminal unit 81 has obtained the token, terminal unit 11 outputs its own cells to a 1.2G high data rate line (terminal unit connecting cable) 95, and releases and sends the obtained token. Therefore, the succeeding terminal unit 82 positioned downstream receives the above described cell as well as the token. Terminal unit 81 sends only the token to the succeeding terminal unit 82 if it has no cells in its own buffer.

Likewise, upon receiving a token, the terminal unit 82 sends a cell (if any in its own buffer) to a high data rate line (terminal unit connection cable) 96 after adding its own cells and token to the end of the cells of the preceding terminal unit 81. If there are no cells in its own buffer, the terminal unit 82 sends the cells of the preceding terminal unit 81 with only a token added to the cells.

Terminal unit 83 sends a cell (if any in its own buffer) to a high data rate line (switch connection cable) 97 after adding the cells to the end of the cells of the terminal units 81 and 82. However, terminal unit 83 sends a token to terminal unit 81 through a high data rate line (terminal unit connection table) 94.

The above described process is repeated, thus transmitting multiplexed cells to the switch. If a token has been cleared by an error, etc., then only terminal unit 81 is responsible for generating a new token.

The configuration of the above described terminal units are further explained as follows. As shown in FIG. 2, each of the terminal units comprises four connectors a, b, c, and d. The terminal units 81, 82, and 83 are serially connected to switches with high data rate lines (switch connection cables) 91 and 97 and high data rate lines (terminal unit connection cables) 92–96 connected to these connectors a, b, c, and d.

When cells are output to a high data rate line, the cells are transmitted through the path of a switch, the high data rate line (switch connection cable) 91, connectors a and b of terminal unit 81, the high data rate line (terminal unit connection cable) 92, connectors a and b of terminal unit 82, the high data rate line (terminal unit connection cable) 93, and connector a of terminal unit 83. Then, necessary cells are received by the terminal unit 81, 82, or 83.

On the other hand, when cells are output to a low data rate line, cells output by each of the terminal units are transmitted through the path of connector d of terminal unit 81, the high data rate line (terminal unit connection cable) 95, connectors c and d of terminal unit 82, the high data rate line (terminal unit connection cable) 96, and connector c of terminal unit 83 together with a circulating token or a token generated by terminal unit 81. Multiplexed cells are separated from the token by terminal unit 83 and transmitted to a switch through the high data rate line (switch connection cable) 97. Then, the token is returned through the path of connector b of terminal unit 83, the high data rate line (terminal unit connection cable) 94, and connector c of terminal unit 81. The token then starts circulating again, as shown in FIG. 1 after exiting from connector d.

Thus, if a token is lost due to an error, etc. and terminal unit 81 recognizes that it is the highest order terminal unit, a new token should be generated by terminal unit 81. Then, terminal 82 unit should recognize that it is an intermediate terminal unit, and send downstream a cell with a token. Likewise, terminal unit 83 should recognize that it is the lowest order terminal unit, separate a token from a cell, and send it back to the highest order terminal unit.

Since the operation of each terminal unit depends on its position in a connection sequence, each terminal unit is assigned a different operation. The operations are set by a plurality of dip switches such that each of them is assigned to a corresponding position in the connection sequence.

However, with the above described conventional connection, a troublesome reorganization must be performed if a new terminal unit is added to terminal unit 83 shown in FIG. 1 as follows. First, the existing terminal unit connection cable 94 between the highest order terminal unit 81 and the lowest order terminal unit 83 is removed and set to connect the highest order terminal unit 81 to the new terminal unit. Then, the switch connection cable 97 is removed from terminal unit 83 and connected to the new terminal unit. Furthermore, terminal unit 83 is released from the operation of the lowest order position and newly assigned an operation for an intermediate position. Thus, adding a terminal unit requires more than a few process steps, and causes a very difficult problem with connection changing.

If a replacement or additional terminal unit is assigned a wrong operation in the connection sequence, it erroneously functions, and does not perform a correct operation, according to the wrong assignment after the replacement or addition. Consequently, there is the problem that the system may malfunction after the replacement or the addition.

SUMMARY OF THE INVENTION

An object of the present invention is to realize reliable terminal units and a method of connecting them. The terminal units are designed such that a new terminal unit can be easily added, or an existing terminal can be easily replaced, unit without causing a malfunction by the addition or replacement, in an ATM switching system. This can be attained by adding a terminal unit without rearranging existing terminal unit connection cables and switch connection cables, by having replacement and added terminals operating correctly without appropriately assigning operations to the new terminals, and by detecting a defective connection or disconnection of a terminal unit connection cable.

To realize the above described object, the present invention connects a highest order terminal unit to a line switch through a pair of two-way high data rate lines (switch connection lines), serially connects the succeeding terminal unit to the highest order terminal unit through a pair of two-way high data rate lines (terminal unit connection lines), and connects downstream a terminal in series through another pair of two-way high data rate lines (terminal unit connection lines). Thus, lower order terminal units are sequentially connected in series.

A cell output to a low data rate line is transmitted together with a token from the lowest order terminal unit sequentially to the highest order line by being multiplexed by each terminal, through a high data rate line (terminal unit connection line), a preceding terminal unit, a high data rate line (terminal unit connection line), and a further upstream terminal unit, and so on. Since the highest order terminal unit receives a switch identification signal a from the line switch and a terminal unit identification signal c from downstream, it recognizes that it is the highest order terminal unit in the stream, separates a cell from a token, and sends the cell to the line switch and returns the token downstream. Since an intermediate terminal unit does not receive a switch identification signal a but receives only a terminal unit identification signal c, it recognizes that it is an intermediate terminal unit, and returns a token received from upstream to a lower order terminal unit. Since the lowest order terminal unit does not receive a signal a or c, it recognizes that it is the lowest order terminal, and sends upstream a cell received through a low data rate line according to a token sent back from a higher order terminal unit. If a token has been lost, a new token is generated.

Thus, according to the present invention, since a terminal unit can be added to existing terminal units without rearranging existing terminal unit connection cables or switch connection cables, conventional troublesome and difficult additions can be replaced with much easier operations. Thus, the efficiency of an adding process is greatly improved. Furthermore, since an added or replacement terminal unit is designed to operate always correctly, the possibility of the malfunction of a system due to an erroneous assignment of a process to an added or replacement terminal unit can be removed completely. Therefore, the reliability of the system can be enhanced greatly. Additionally, since there is no need for a check of each process, an operator can be devoted to an addition or replacement, the efficiency of the entire process becomes furthermore improved. In addition as a disconnection or defective connection, if any, can be easily detected, an erroneous connection with a terminal unit connection cable can be automatically checked during an addition or replacement, the reliability of the system can be furthermore enhanced.

Thus, the present invention realizes a method of connecting terminal units in an ATM switching system with an addition or replacement carried out easily and correctly, and the reliability of the resultant system can be expected to be extremely high.

BRIEF DESCRIPTION OF THE DRAWINGS

One skilled in the art can easily understand additional features and objects of this invention from the description of the preferred embodiments and some of the attached drawings. In the drawings:

FIG. 10 shows the configuration of a circuit of each terminal unit according to the second embodiment;

DESCRIPTION OF THE PREFERRED EMBODIMENTS

Figure 1:
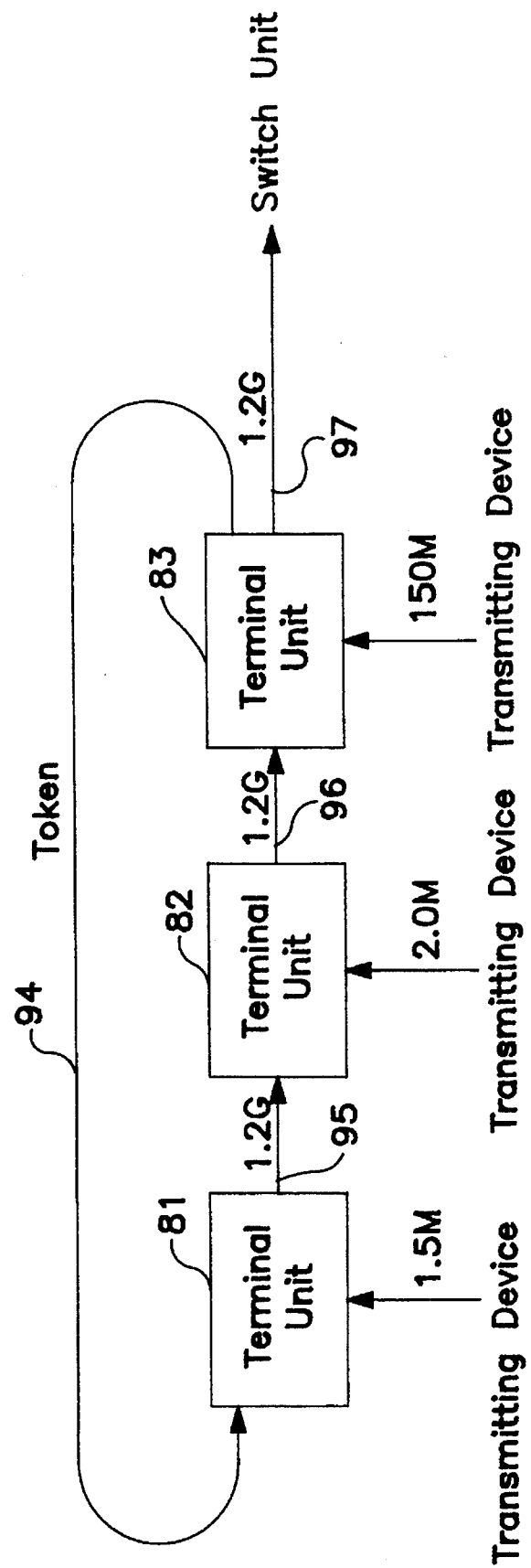
FIG. 1 shows the relationship between the conventional terminal units and a switch.
Figure 2:
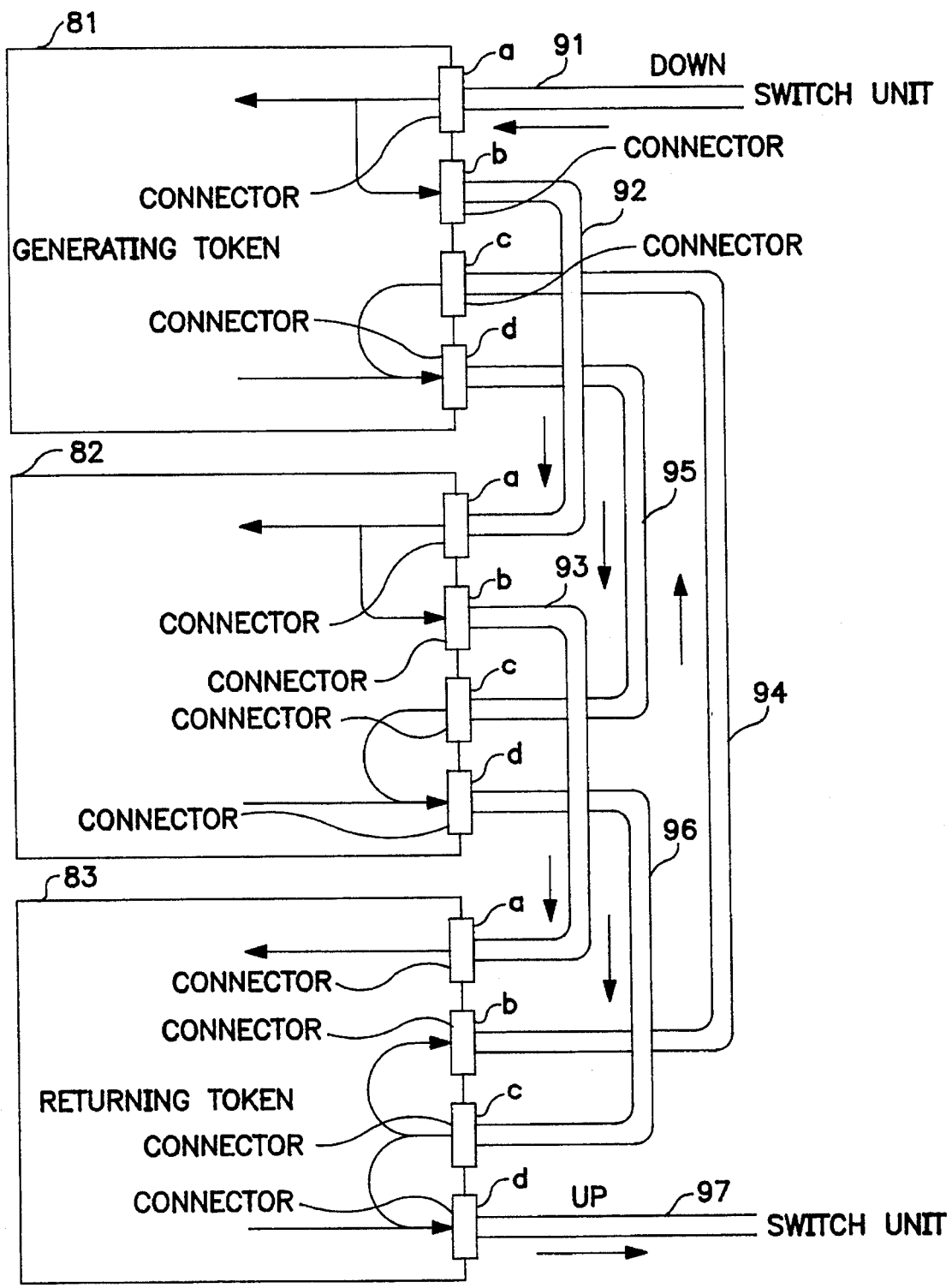
FIG. 2 shows a method of connecting the conventional terminal units.
Figures 3A, 3B, 3C:
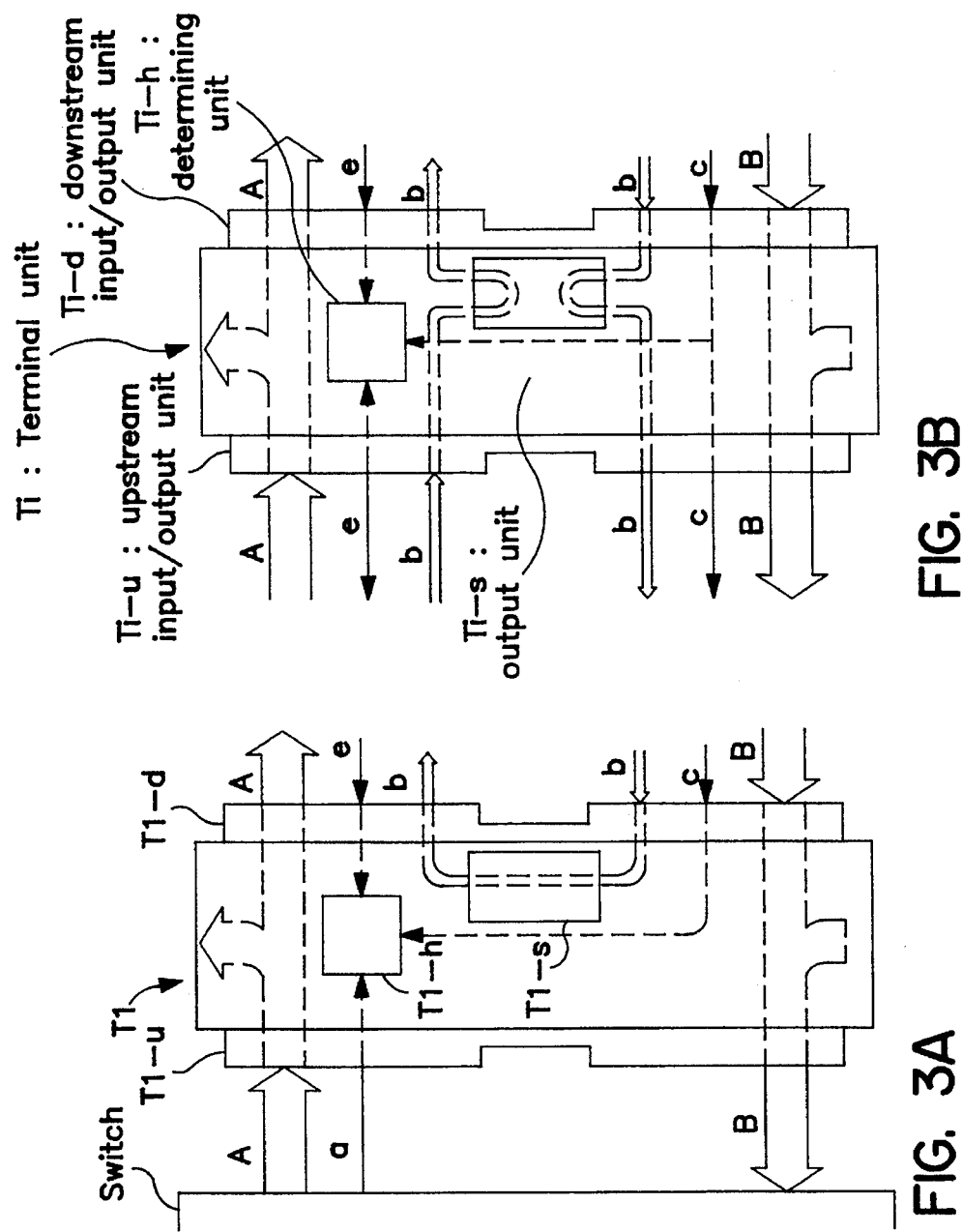
FIGS. 3A, 3B and 3C show the principle (1) according to the present invention.
Figure 4:
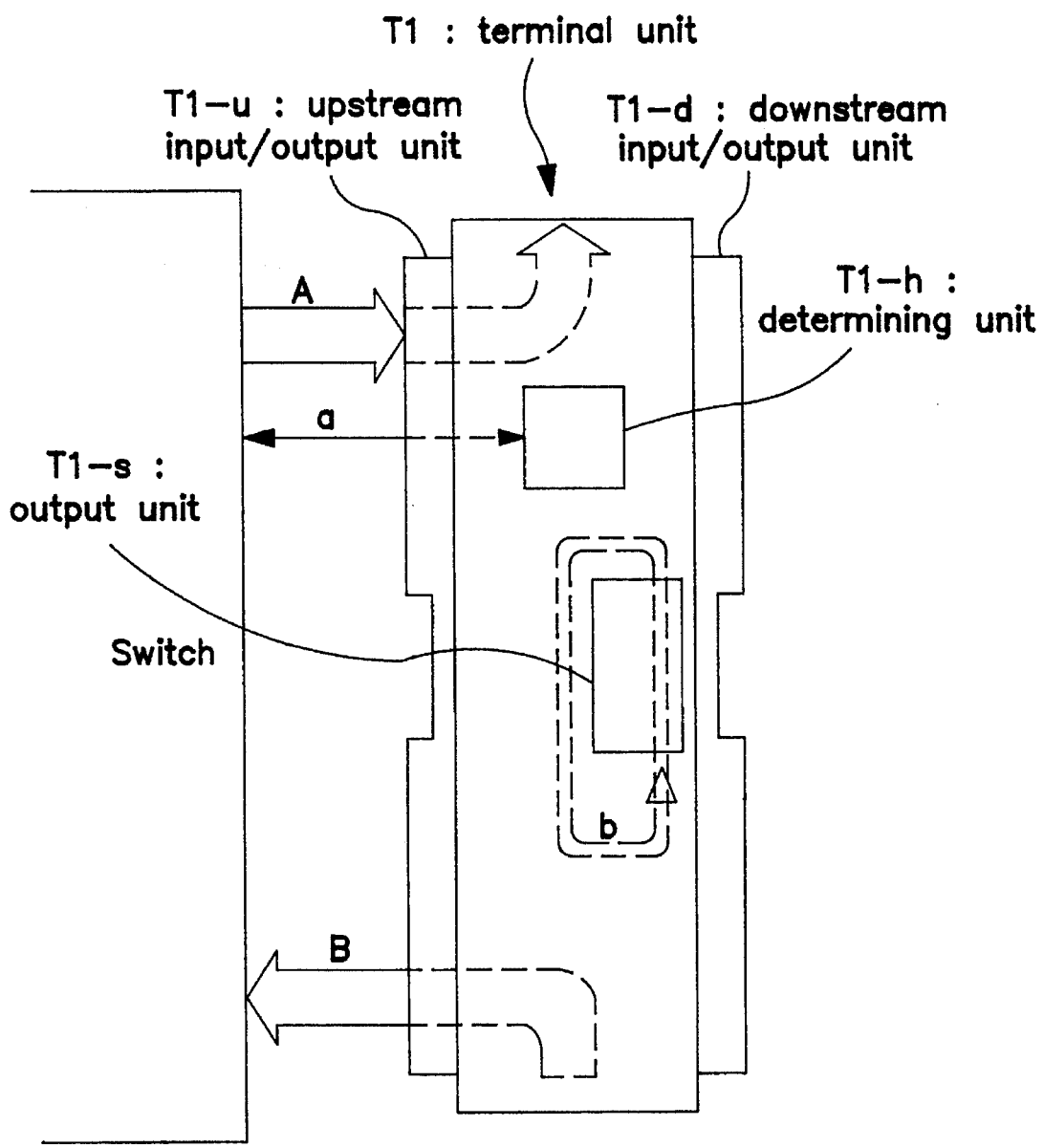
FIG. 4 shows the principle (2) according to the present invention.

The present invention is applied to a plurality of terminal units serially connected to a switch for communication lines through a switch connecting communication line in an ATM switching system. The embodiment of the present invention is explained below by referring to the attached drawings.

FIGS. 3A, 3B, 3C and 4 show the principle of the present invention.

In FIGS. 3A, 3B, 3C, and 4, upstream input/output unit Ti-u is connected to the above described switch through the above described switch connecting communication line, or is connected to preceding terminal Ti-1 (i=1, 2, ..., n) connected in series to input or output a signal. Upstream input/output unit Ti-u comprises an interface, etc. having, for example, an input connector and an output connector.

Downstream input/output unit Ti-d is connected to succeeding terminal unit Ti+1 connected in series through the above described terminal unit connecting communication line to input or output a signal. Downstream input/output unit Ti-d comprises an interface, etc. having an input connector and an output connector.

Determining unit Ti-h determines the connection position of the present terminal Ti in the above described serial connection according to the existence of a signal a added to a data signal A applied to the input line of upstream input/output unit Ti-u and indicating the connection of the switch, and according to the existence of a signal c applied to the input line of downstream input/output unit Ti-d and indicating the connection of succeeding terminal unit Ti+1. Determining unit Ti-h comprises a determining circuit, etc., having, for example, a logical gate, etc. For example, it determines that the present terminal unit Ti is terminal unit T1 (i=1) directly connected to the above described switch by detecting a signal a applied to the input line of upstream input/output unit Ti-u of the present terminal unit Ti and indicating the connection of the switch. It also determines that succeeding terminal unit T2 (i+1) is connected to the present terminal unit T1 (i=1) by detecting a signal c applied to the input line of downstream input/output unit T1-d of the present terminal unit T1 (i=1) and indicating the connection of the succeeding terminal unit T. According to the two determinations, it is determined that the present terminal unit T1 (i=1) is the highest order terminal unit in a plurality of serially connected terminal units.

Determining unit Ti-h determines that the present terminal unit Ti is terminal unit T1 (i=1) directly connected to the switch by detecting a signal a applied to the input line of upstream input/output unit Ti-u of the present terminal unit Ti and indicating the connection of the switch. It also determines that succeeding terminal unit T2 (i+1) is not connected to the present terminal unit T1 by not detecting a signal c applied to the input line of downstream input/output unit Ti-d of the present terminal unit T1 and indicating the connection of the succeeding terminal unit T. According to the two determinations, it is determined that the present terminal T1 (i=1) is the only terminal unit connected to the switch.

Determining unit Ti-h determines that terminal unit Ti-1 is connected prior to the present terminal Ti by not detecting a signal a applied to the input line of upstream input/output unit Ti-u of the present terminal unit Ti and indicating the connection of the switch. It also determines that succeeding terminal unit Ti+1 is connected to the present terminal unit Ti by detecting a signal c applied to the input line of downstream input/output unit Ti-d of the present terminal unit Ti and indicating the connection of the succeeding terminal unit T. According to the two determinations, it is determined that the present terminal unit Ti is an intermediate terminal unit T (T2, T3, . . . , Tn-1) located at an intermediate position in a plurality of serially connected terminal units.

Furthermore, determining unit Ti-h determines that terminal Ti-1 is connected prior to the present own terminal unit Ti because a signal a applied to the input line of upstream input/output unit Ti-u of the present terminal unit Ti and indicating the connection of the switch is not detected. It also determines that terminal Ti+1 is not connected following the present terminal unit Ti because a signal c applied to the input line of downstream input/output unit Ti-d of the present terminal unit Ti and indicating the connection of succeeding terminal unit Ti+1 is not detected. According to the two signals, it is determined that the present terminal unit Ti is the lowest order terminal unit Tn (i=n) in a plurality of terminal units T connected to the switch.

Additionally, determining unit Ti-h determines whether the input and output lines of downstream input/output unit Ti-d of the present terminal unit Ti are normally connected to succeeding terminal unit Ti+1 according to the existence of a signal c applied to the input line of downstream input/output unit Ti-d of the present terminal unit Ti and indicating the connection of the succeeding terminal unit T, and according to the existence of another signal e applied to the output line of downstream input/output unit Ti-d and indicating the connection of the succeeding terminal unit Ti+1.

Output unit Ti-S selects the destination of a data sending permission signal b applied according to the determination by determining unit Ti-h or generated by the present terminal unit Ti, and sends the signal to the destination. Output unit Ti-S separates from a data signal B to be sent to the switch a data sending permission signal b applied with the data signal B sent from succeeding terminal unit T2 to the switch, and then sends it back to succeeding terminal T2 if output unit Ti-S comprises a selector, etc. and determining unit determines Ti-h that the present terminal unit Ti is terminal T1 (i=1) at the highest order in a plurality of terminal units. If determining unit Ti-h determines that the present terminal unit Ti is the only terminal unit T, then output unit Ti-S sends a data sending permission signal b generated by the present terminal unit T1 (i=1) to a predetermined circuit of the present terminal unit T1. If determining unit Ti-h determines that the present terminal unit Ti is an intermediate terminal unit T (T2, T3, . . . , Tn-1) in the stream, then a data sending permission signal b applied together with a data signal B transmitted from succeeding terminal Ti+1 to the switch is transmitted to preceding terminal unit Ti-1 together with a data signal B obtained by multiplexing a data signal of the present terminal unit Ti to the data signal B of succeeding terminal unit Ti+1. Then a data sending permission signal b transmitted back from preceding terminal unit Ti-1 is transmitted back to succeeding terminal unit Ti+1 as is. If it is determined by determining unit Ti-h that the present terminal unit Ti is the lowest order terminal unit Tn (i=n), then a data sending permission signal b transmitted back from preceding terminal unit Tn-1 is sent back to preceding terminal unit Tn-1 together with a data signal B transmitted from the present terminal unit Tn to the switch. If it is determined that a data sending permission signal b has been lost, then a data sending permission signal b generated by the present terminal Tn is transmitted to preceding terminal unit Tn-1 together with a data signal B sent from the present terminal unit Tn to the switch.

Then, the switch is connected to terminal Ti such that the input line of upstream input/output unit Ti-u is connected to the down-communication line for transmitting a data signal A from the switch of the switch connecting communication line to terminal unit Ti, and such that the output line of upstream input/output unit Ti-u of terminal unit Ti is connected to the up-communication line for transmitting a data signal B from terminal unit Ti of the switch connecting communication line to the switch.

Serially connected terminal unit Ti is connected to its succeeding terminal Ti+1 such that the input line and the output line of downstream input/output unit Ti-d of terminal Ti are connected respectively to the output line and the input line of upstream input/output unit Ti+1-u of succeeding terminal Ti+1.

Therefore, terminals can be added without rearranging existing terminal unit connection cables or switch connecting cables, and added and replacement terminal units can be operated correctly without appropriately assigning their own processes. Furthermore, since a disconnection or a defective connection can be reliably detected according to the present invention, adding and replacing operations can be easily performed without a malfunction of the system after the addition or the replacement of a terminal unit. Thus, a reliable ATM switching system can be realized by terminal units and an appropriate connecting method.

Next, the first embodiment of the present invention is explained as follows.

Figure 5:
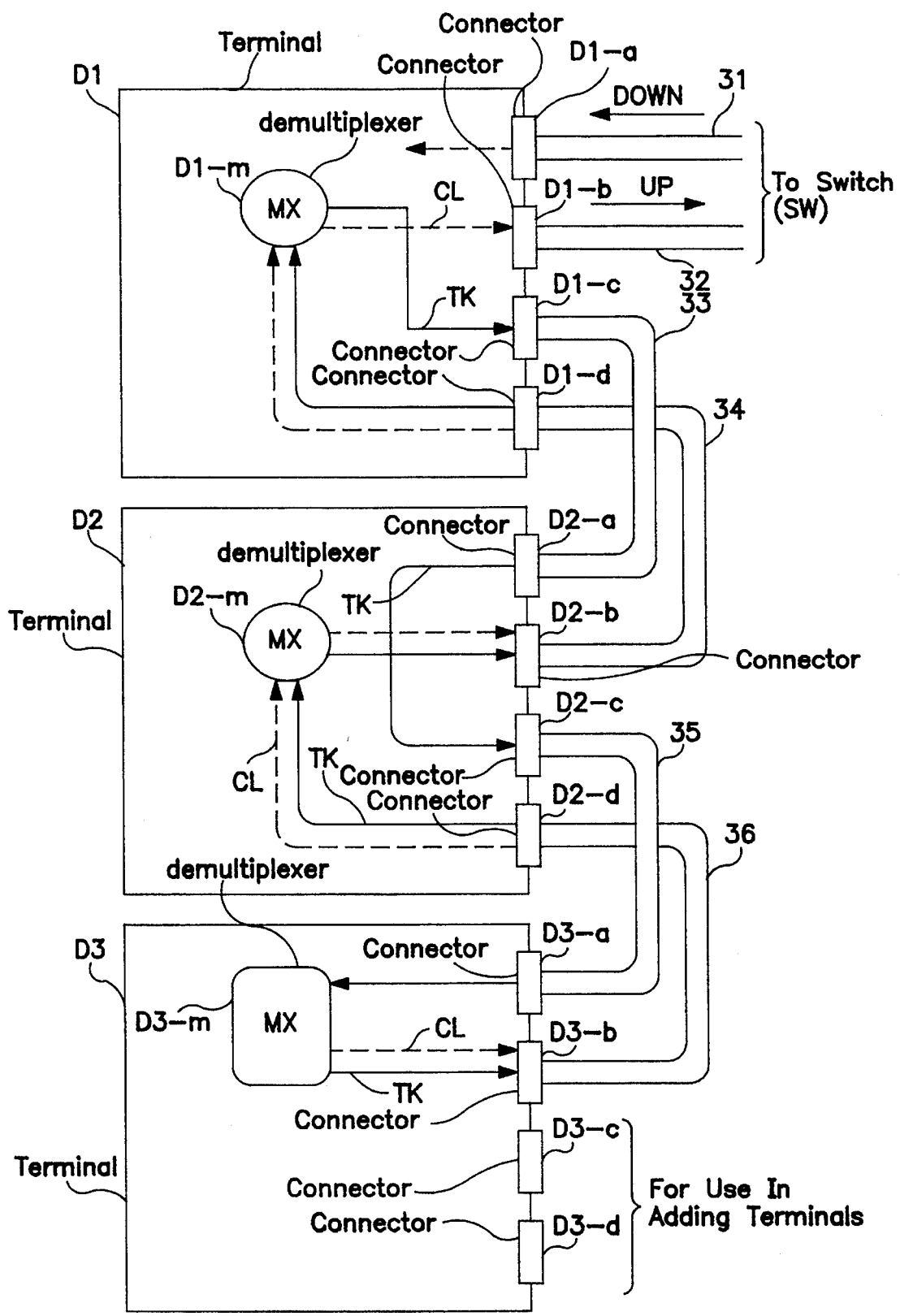
FIG. 5 shows the configuration according to the first embodiment.

FIG. 5 shows the configuration according to the first embodiment. In FIG. 5, terminals D1, D2, and D3 are serially connected via high data rate lines 34, 35, and 36 to make one group. The highest order terminal unit D1 is connected to a switch SW (not shown in FIG. 5) through high data rate lines 31 and 32. Low data rate lines (not shown in FIG. 5) are connected to terminals D1, D2, and D3. Each terminal Di (i=1, 2, or 3) comprises connectors Di-a, Di-b, Di-c, and Di-d. The above described terminal units D1, D2, and D3 correspond to T1, Ti, and Tn shown in the principle in FIG. 3. The high data rate lines and 35 correspond to the transmission lines for signals A, e, and b shown in FIGS. 3A, 3B, 3C, and the high data rate lines 34 and 36 correspond to the transmission lines for signals b, c, and B shown in FIGS. 3A, 3B and 3C. Furthermore, connectors Di-a and Di-b correspond to Ti-u shown in FIG. 3B, and connectors Di-c and Di-d correspond to Ti-d shown in FIG. 3B.

In FIG. 5, cells transmitted through a high data rate line 31 (switch connection cable) are sent from the switch SW and entered through connector D1-a of terminal D1, and then transmitted downstream through connector D1-C, the high data rate line (terminal unit connection cable) 33, connectors D2-a and D2-c of terminal unit D2, the high data rate line (terminal unit connection cable) 35, and connector D3-a of terminal unit D3. Each terminal unit Di comprises a demultiplexer DMX, receives necessary cells, and distributes and sends them through its low data rate line at a data rate depending on the capabilities of its low data rate line.

Cells transmitted through a low data rate line (refer to the broken lines shown in FIG. 5) are transmitted upstream with a token (transmitted as indicated by the real line TK shown in FIG. 5) through connector D3-b of terminal unit D3, the high data rate line (terminal unit connection cable) 36, connectors D2-d and D2-b of terminal unit D2, the high data rate line (terminal unit connection cable) 34, and connector D1-d of terminal unit D1 while they are multiplexed by multiplexing circuit MX (D3-m, D2-m, and D1-m) of each terminal unit Di.

Terminal unit D1 is described later in detail. It recognizes that it is the highest order terminal unit, separates from a token a cell applied from downstream, sends the cell to the high data rate upline (switch connection cable) 32, and returns the token downstream from connector D1-d to terminal unit D2 through the high data rate line (terminal unit connection cable) 33.

Terminal unit D2 also recognizes that it is an intermediate terminal, and returns the token, which is returned from upstream terminal unit D1 to its own connector D2-a, from connector D2-c to downstream terminal unit D3 via the high data rate line (terminal unit connection cable)

Likewise, terminal unit D3 recognizes that it is the lowest order terminal, multiplexes the cells transmitted through the low data rate line and sends them upstream together with a token according to a token returned to connector D3-a from upstream terminal unit D2. Then, according to the present embodiment, the lowest order terminal unit D3 generates a new token if an old token has been lost.

Figure 6:
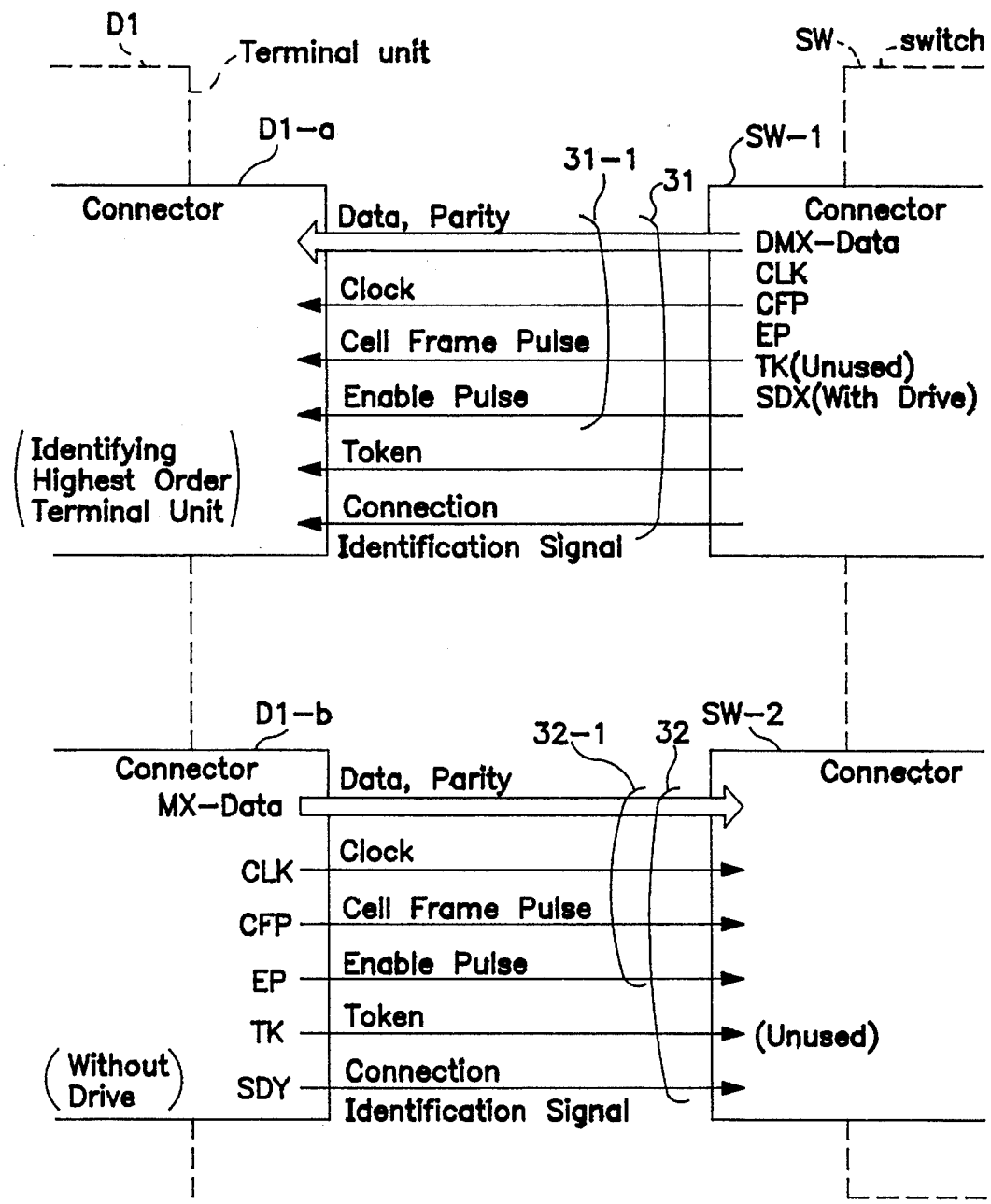
FIG. 6 shows the configuration of a signal between a switch and a terminal unit according to the first embodiment.
Figure 7:
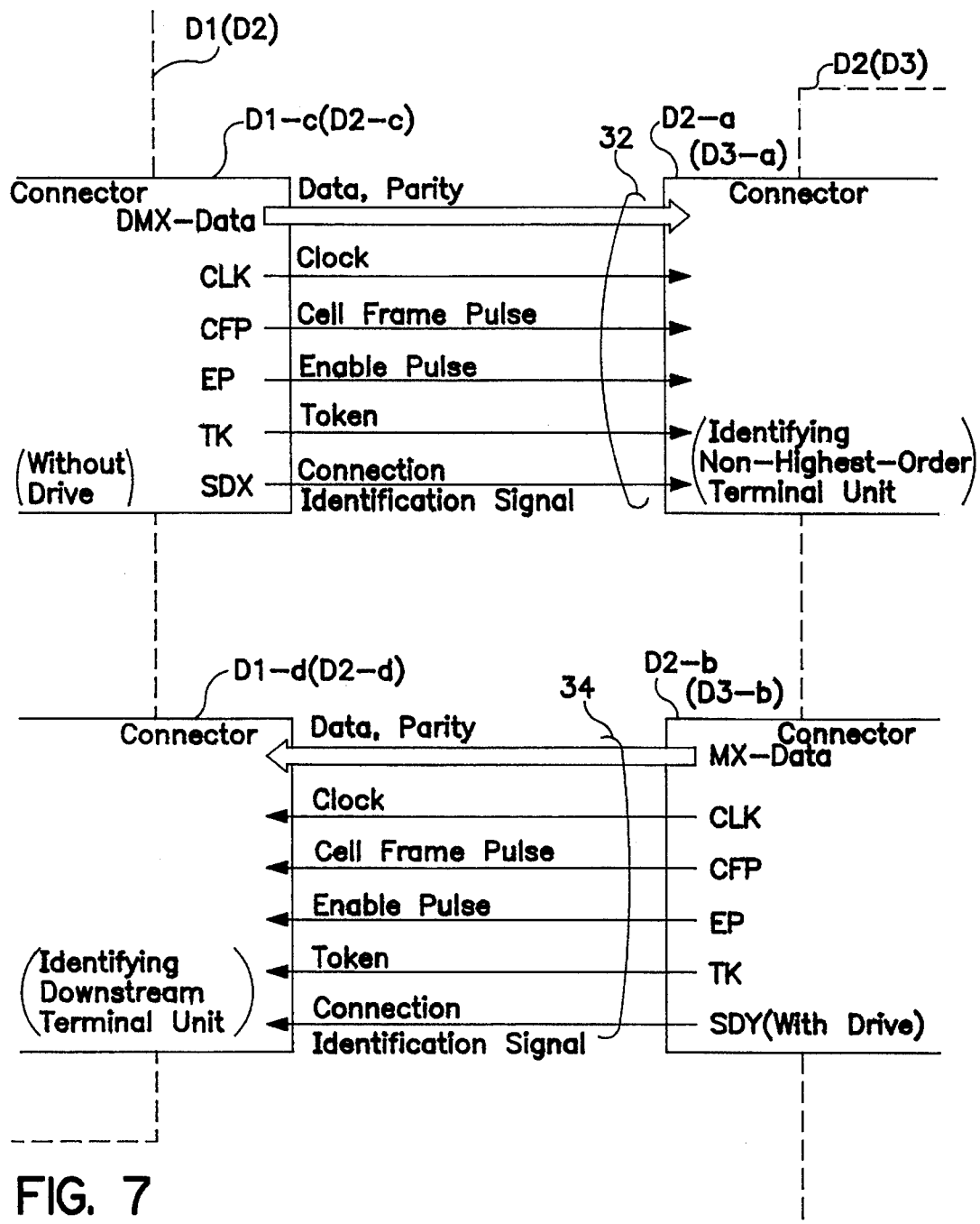
FIG. 7 shows the configuration of a signal between terminal units according to the first embodiment.

FIGS. 6 and 7 illustrate by referring to the signal configuration the method by which a terminal unit can recognize the position of itself without assigning a position detecting operation.

FIG. 6 shows the configuration of the signal transmitted between the highest order terminal unit D1 and the switch SW. The upper portion of FIG. 6 shows the signal transmitted from connector SW-1 of the switch SW to connector D1-a of terminal unit D1 through the switch connection cable 31 (high data rate down-line). The lower portion of FIG. 6 shows the signal transmitted from connector D1-b of terminal unit D1 to connector SW-2 of the switch SW through the switch connection cable 32 (high data rate up-line).

Each of the signals shown in the upper and lower portions of FIG. 6 comprises a token TK and a connection identification signal SDX (or SDY) in addition to the conventional signal configuration 31-1 (or 32-1) comprising data/parity DMX-DATA (or MX DATA), a clock CLK, a cell frame pulse CFP, and an enable pulse EP. The above signals SDX and SDY correspond to signals a and c, respectively.

The signal area of a token TK is used by connectors D1-a and D1-b commonly used by each terminal unit. The token TK is the signal used only in the group comprising terminal units D1, D2, and D3. The signal area is unused by the switch SW.

The switch SW also comprises a driving circuit for a connection identification signal SDX, which is a signal allowing terminal unit D1 to recognize the connection to the switch SW. The connection identification signal SDX is transmitted from connector SW-1 to terminal D1 through the switch connection cable 31 (high data rate downline).

Then, terminal unit D1 recognizes, according to a connection identification signal SDX added to the cell applied from the switch SW through its own connector D1-a, that it is connected to the switch SW, meaning that it is the highest order terminal unit.

According to this recognition, terminal unit D1 separates a token TK from a cell as shown in FIG. 5, returns the separated cell downstream, and transmits the cell to a high data rate line.

There is a terminal unit connection identification signal SDY used between connector D1-b of terminal D1 and connector SW-2 of the switch SW. It is a signal area used by a connector commonly used by each terminal unit, and the signal is not transmitted to the switch SW.

Next, FIG. 7 shows the configuration of a signal transmitted between terminal unit D1 and its succeeding terminal unit D2. The upper portion of FIG. 7 shows the signal transmitted from connector D1-c of terminal unit D1 to connector D2-a of terminal unit D2 through the terminal unit connection cable 33 (high data rate line). The lower portion of FIG. 7 shows the signal transmitted from connector D2-b of terminal D2 to connector D1-d of terminal unit D1 through the terminal unit connection cable 34 (high data rate line).

The symbols shown in parentheses such as DI(D2), D2(D3), etc. shown in FIG. 7 indicate that (refer to FIG. 5)

the connections between connectors D1-c and D1-d of terminal unit D1 and connectors D2-a and D2-b of terminal unit D2 are the same as those between connectors D2-c and D2-d of terminal D2 and connectors D3-a and D3-b of terminal DS. Therefore, a signal between terminals D1 and D2 shown in FIG. 7 can be used as is as a signal between terminal units D2 and D3. Thus, the signal configuration of each terminal unit Di is the same as that of its succeeding terminal Di+1.

In FIG. 7, cells transmitted through a high data rate line (data/parity DMX-DATA, a clock CLK, a cell frame pulse CFP, and an enable pulse EP), a token TK, and a connection identification signal SDX constantly indicating "off" are sent from connector D1-c of terminal D1 to connector D2-a of the succeeding terminal unit D2.

Terminal D2 recognizes that it is not the highest order terminal according to the "off" state indicated by a connection identification signal SDX applied to connector D2-a.

Cells transmitted through a low data rate line (data/parity MX-DATA, a clock CLK, a cell frame pulse CFP, and an enable pulse EP), a token TK, and a connection identification signal SDY constantly indicating "on" are sent from connector D2-b of terminal unit D2 to connector D1-d of preceding terminal unit D1.

Terminal unit D1 recognizes that it has succeeding terminals if a connection identification signal SDY applied to connector D1-d indicates "on".

The signal configuration between connector D2-d of terminal D2 and connector D3-b of terminal D3 is the same as described above. Therefore, terminal unit D2 recognizes that it has a succeeding terminal. Terminal unit D2 recognizes that it is an intermediate terminal unit because the above described terminal unit is the highest order terminal unit and that it has a succeeding terminal unit. Thus, a token TK applied from upstream as shown in FIG. 5 is outputted downstream, and a token TK and a cell applied from downstream are sent upstream together with the cells multiplexed by terminal unit D2.

Terminal unit D3 as well as terminal unit D2 recognizes that it is the highest order terminal unit. No terminal unit connection cables are connected to connectors D3-c or D3-d. Accordingly, it recognizes that a connection identification signal SDY is not applied, that is, a connection identification signal SDY indicates "off". Therefore, it recognizes that it has no succeeding terminal units. Since terminal unit D3 is the highest order terminal and has no succeeding terminal units, it recognizes that it is also the lowest order terminal unit, that is, it is a token master. Based on the recognition, it generates a token if an old token has been lost.

Figure 8:
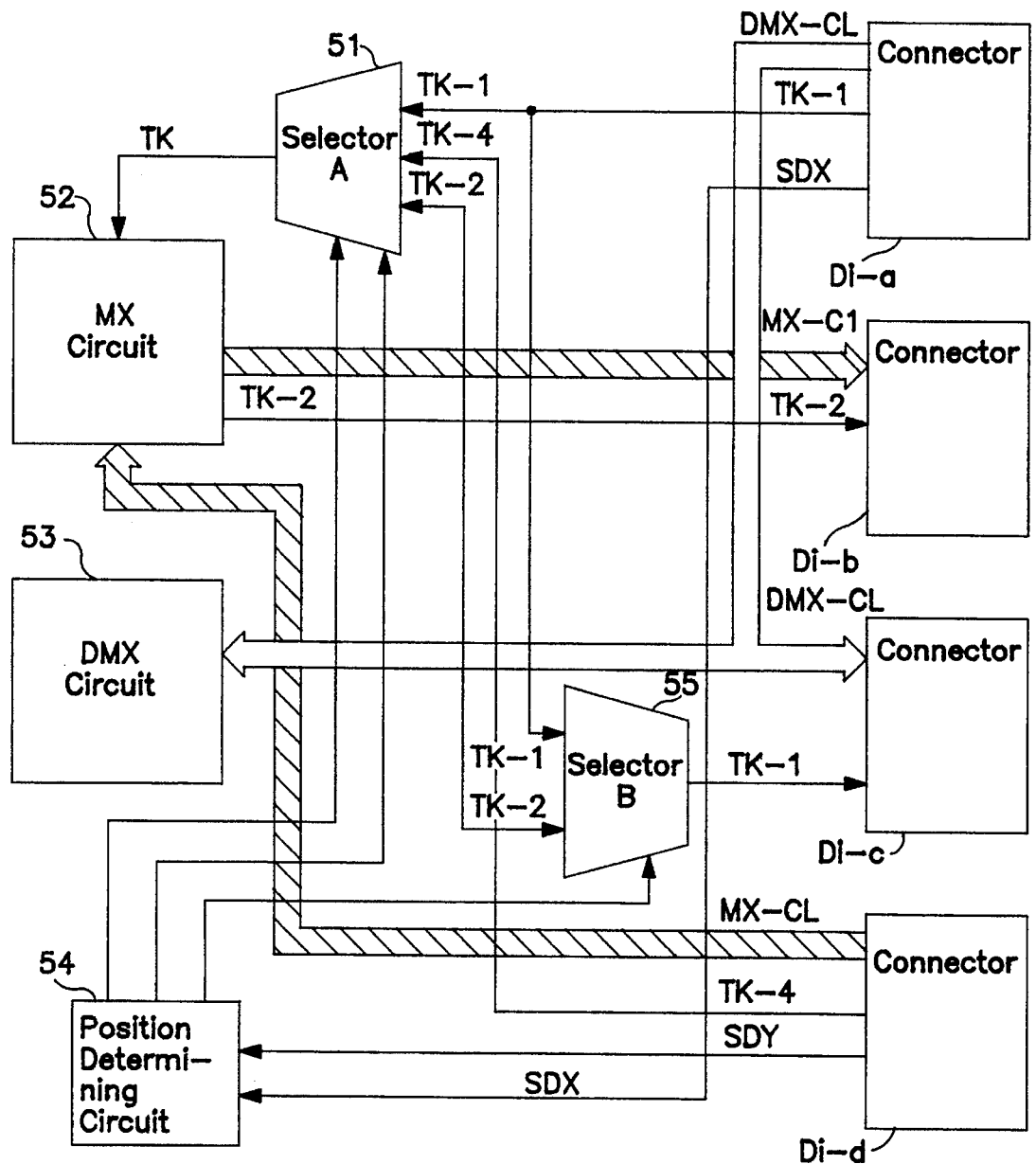
FIG. 8 shows the configuration of a circuit of each terminal unit according to the first embodiment.

With the configuration according to the first embodiment, a terminal unit recognizes its own position. FIG. 8 shows the detailed circuit configuration of each terminal unit so that each terminal can perform a process depending on its own position.

As shown in FIG. 8, terminal Di comprises connectors Di-a, Di-b, Di-c, and Di-d, selectors A51 and B55, an MX circuit 52, a DMX circuit 53, and a position determining circuit 54. The position determining circuit 54 corresponds to the determining unit Ti-h shown in the principle in FIG. 3. Selectors A51 and B55 correspond to the transmitting unit Ti-s shown in FIG. 3B.

A cell DMX-CL (a signal, data/parity DMX-DATA, a clock CLK, a cell frame pulse CFP, and an enable pulse EP shown in FIGS. 6 and 7) transmitted through a high data rate line, a token TK-1, and a switch connection identification signal SDX are applied from the switch SW or an upstream terminal unit to connector Di-a.

Connector Di-a outputs a cell DMX-CL transmitted through a high data rate line to the DMX circuit 53, a token TK-1 to the selector 51, and the switch connection identification signal SDX to the position determining circuit 54 respectively.

A cell MX-CL multiplexed from a downstream terminal unit and transmitted through a low data rate line (a signal, data parity MD-DATA, a clock CLK, a cell frame pulse CFP, and an enable pulse EP shown in FIGS. 6 and 7), a token TK-4, and a terminal unit connection identification signal SDY are applied to connector Di-d. Otherwise, no connections are made for a high data rate line if there are no downstream terminal units. Therefore, no signals are applied at all. That is, a cell MX-CL, a token TK-4, and a terminal unit connection identification signal SDY are all in an "off" state.

Then, connector Di-d outputs a cell MX-CL applied through the low data rate line to the MX circuit 52, the token TK-4 to the selector A51, and the terminal unit connection identification signal SDY to the position determining circuit 54 respectively.

The position determining circuit 54 performs a position determining process on the present terminal unit as described later according to the applied switch connection identification signal SDX and the terminal unit connection identification signal SDY, and then notifies the selector A51 and the selector B55 of the result.

The selector A51 selects one of the token TK-1 applied through connector Di-a, the token TK-4 applied through connector Di-d according to the notification from the above described position determining circuit 54, or selects one of any tokens TK-2 output by the MX circuit 52. Then, the result is output as a token TK to MX circuit 52.

The MX circuit 52 generates a new cell MX-CL by multiplexing a cell of the present terminal unit in a low data rate line and stores it in the buffer not shown in the drawings together with a cell MX-CL from the downstream terminal unit applied through connector Di-d when the token TK applied through the selector A51 indicates an "on" state. The new cell MX-CL is transmitted with the "on" token TK-2 from connector Di-b to the switch SW or an upstream terminal unit. Simultaneously, the above described token TK-2 is outputted to the selectors A51 and B55.

The selector B55 selects one of a token TK-1 applied through connector Di-a and a token TK-2 outputted from the MX circuit 52 according to the notification from the above described position determining circuit 54, and outputs the result as a new token TK-1 to a downstream terminal unit through connector Di-c.

Finally, the DMX circuit 53 extracts a necessary cell for the present terminal unit from a cell DMX-CL in a high data rate line applied through connector Di-a, and sends remaining cells DMX-CL to a downstream terminal unit through connector Di-c.

Figure 9:
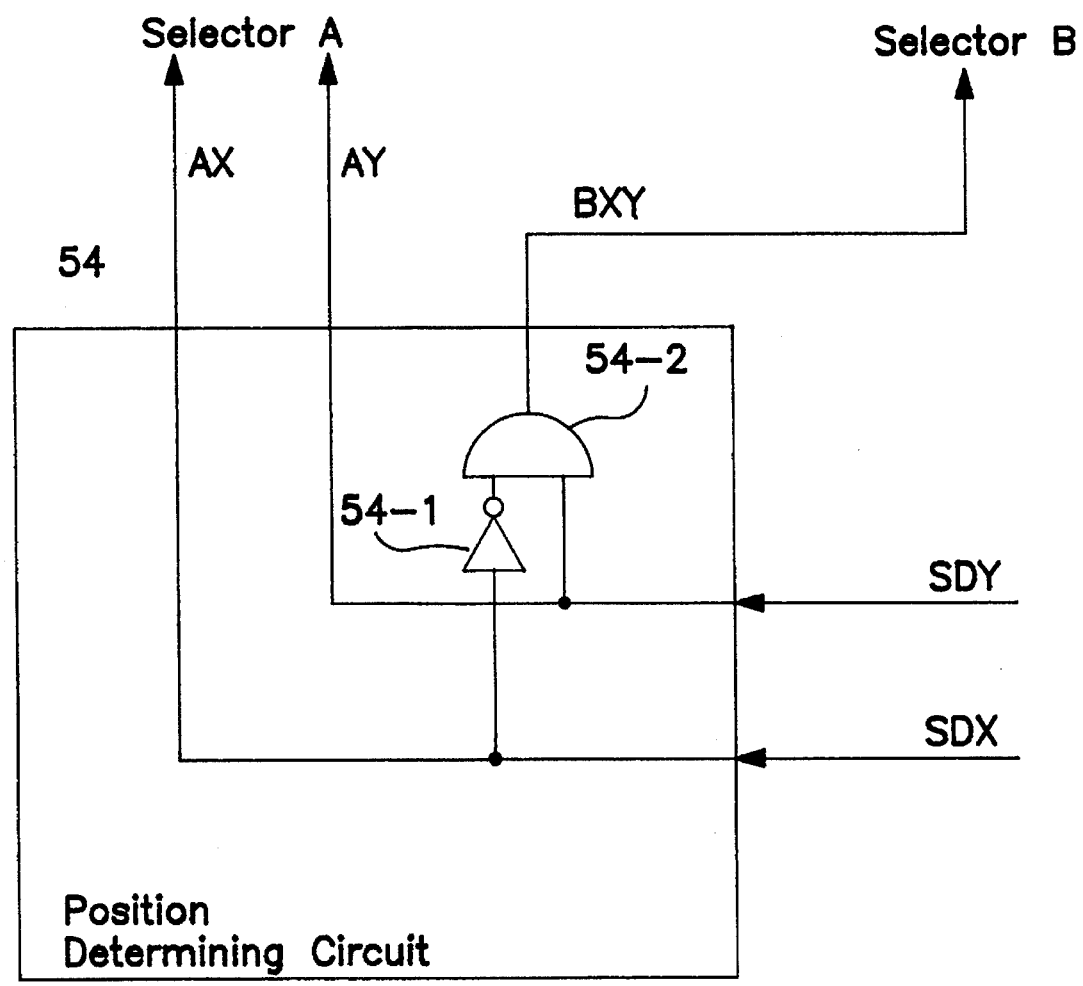
FIG. 9 shows a process of determining the position of a terminal unit using its own position determining circuit, and shows an algorithm for determining a selector signal according to the determination result.

FIG. 9 shows the configuration of the above described position determining circuit 54. As explained by referring to FIG. 8, the position determining circuit 54 receives a switch connection identification signal SDX and a terminal connection identification signal SDY. The position determining circuit 54 outputs the signals SDX and SDY as determination signals AX and AY respectively to selector A, while it receives the SDX signal to the AND circuit 54-2 through the inverter 54-1, and an AND logic of the input and the signal SDY is outputted as a determination signal BXY to selector B. The determination signal BXY outputted to selector A indicates "1" only when the switch connection identification signal SDX indicates "OFF" ("0") and the terminal connection identification signal SDY indicates "ON" ("1"). Otherwise it indicates "OFF" ("0").

With the above described configuration, a signal process for each terminal unit Di described by referring to FIG. 5 is performed.

Next, the logic according to which the position of a terminal unit is determined by the above described position determining circuit 54, and the operation of the selector A51 and the selector B55 depending on the result of the logic is explained based on the algorithm shown in FIG. 9.

FIG. 10 shows, from left to right, a switch connection identification signal SDX 61, a terminal unit connection signal SDY 62, a determination result 63 obtained by the position determining circuit 54, an operation 64 performed by the selector A51 according to the determination result, and an operation 65 performed by the selector B55.

A first row 66 indicates the case where both the switch connection identification signal SDX (a determination signal AX) and the terminal unit connection signal SDY (a determination signal AY) are in an "ON" state ("1"). At this time, the position determining circuit 54 is in the highest order terminal unit connected to the switch SW, and has a terminal unit downstream.

According to the determination result, the selector A51 selects a token TK-4 applied from downstream through connector Di-a, and outputs it to the MX circuit 52. Then, the MX circuit 52 multiplexes and transmits cells according to the token TK 4 applied from downstream.

The selector B55 selects its own token TK-2 outputted by the MX circuit 52, and outputs (returns) it as a token TK-1 downstream through connector Di-c. Thus, a cell is separated from a token and the token is returned.

A second row 67 in FIG. 10 shows the case where a switch connection identification signal SDX indicates "ON" ("1"), and a terminal unit connection signal SDY indicates "OFF" ("0"). At this time, the position determining circuit 54 determines that only the present terminal unit is connected to the switch SW and there are no downstream terminal units.

According to the determination result, the selector A51 selects its own token TK-2 to output it to the MX circuit 52. Thus, the MX circuit 52 multiplexes and sends a cell based on its own token TK-2 only.

At this time, the selector B55 selects and outputs its own token TK-2. However, since the connector Di-c has no downstream terminal unit, the selector B55 actually takes no action at all.

In FIG. 10, a third row 68 describes the case where a switch connection identification signal SDX indicates "off", and a terminal unit connection signal SDY indicates "on". At this time, the position determining circuit 54 determines that the present terminal unit has terminal units upstream and downstream and that it is an intermediate terminal unit.

According to the determination result, the selector A51 selects a token TK-4 received from downstream, and outputs it to the MX circuit 52. At this time, the MX circuit 52 multiplexes and transmits a cell based on the token TK-4 received from downstream.

The selector B55 selects a token TK-1 applied from upstream through connector Di-a, and outputs it downstream (returns it) through connector Di-c. Thus, a token returned from upstream can be returned quickly at a data rate of 1.2 G bit/s to the lowest order terminal unit through a high data rate line for connecting each terminal unit.

In FIG. 10, a last row 69 describes the case where a switch connection identification signal SDX and a terminal unit connection signal SDY indicate "off". At this time, the position determining circuit 54 determines that the present terminal unit is the lowest order unit.

According to the determination result, the selector A51 selects a token TK-1 received from upstream and outputs it to the MX circuit 52. Thus, the MX circuit 52 multiplexes and transmits a cell based on the token TK-1 returned from upstream.

Also at this time, the selector B55 selects and outputs its own token TK-2. However, since the connector Di-c has no downstream terminal unit, the selector B55 actually takes no action at all.

Thus, a signal shown in FIGS. 6 and 7 is processed according to the algorithm shown in FIG. 10 by terminals D1, D2, and D3, each being connected as shown in FIG. 5 and having the circuit configuration as shown in FIGS. 8 and 9, thereby switching signals between a high data rate line and a low data rate line.

When a terminal unit is added to the existing terminal units, the only process performed is connecting free connectors D3-c and D3-d (downstream input/output unit Tn-d in the configuration according to the principle) of the lowest order terminal D3 (Tn in the configuration according to the principle) to connectors D4-a and D4-b (upstream input/output unit Tn+1-u in the configuration according to the principle) of new terminal unit D4 (Tn+1 in the configuration according to the principle). There is no need for the reconnection of the connected lines of the existing terminal units. Therefore, new terminals can be added quite easily.

Based on the above described signal configuration, circuit configuration and algorithm, the lowest-order terminal unit DS recognizes that it has become an intermediate terminal unit after a new terminal unit has been added. Then, based on the recognition, the terminal acts as an intermediate terminal unit. Likewise, newly added terminal unit D4 recognizes that it is the lowest order terminal unit, and acts as the lowest order terminal unit based on the recognition.

Any terminal unit at any position can be replaced with a new terminal unit, and automatically recognizes its position and operation. Therefore, terminal units do not have to be appropriately assigned their own operations at all.

According to the above described circuit configuration, the position of a terminal unit is determined using an identification signal applied through connectors Di-a and Di-d. Considering that connectors Di-a and Di-b or connectors Di-c and Di-d are used in a pair respectively, the position of a terminal unit can be determined by adding a function of monitoring an error of a connector disconnection, etc.

This is explained below as the second embodiment.

Figure 11:
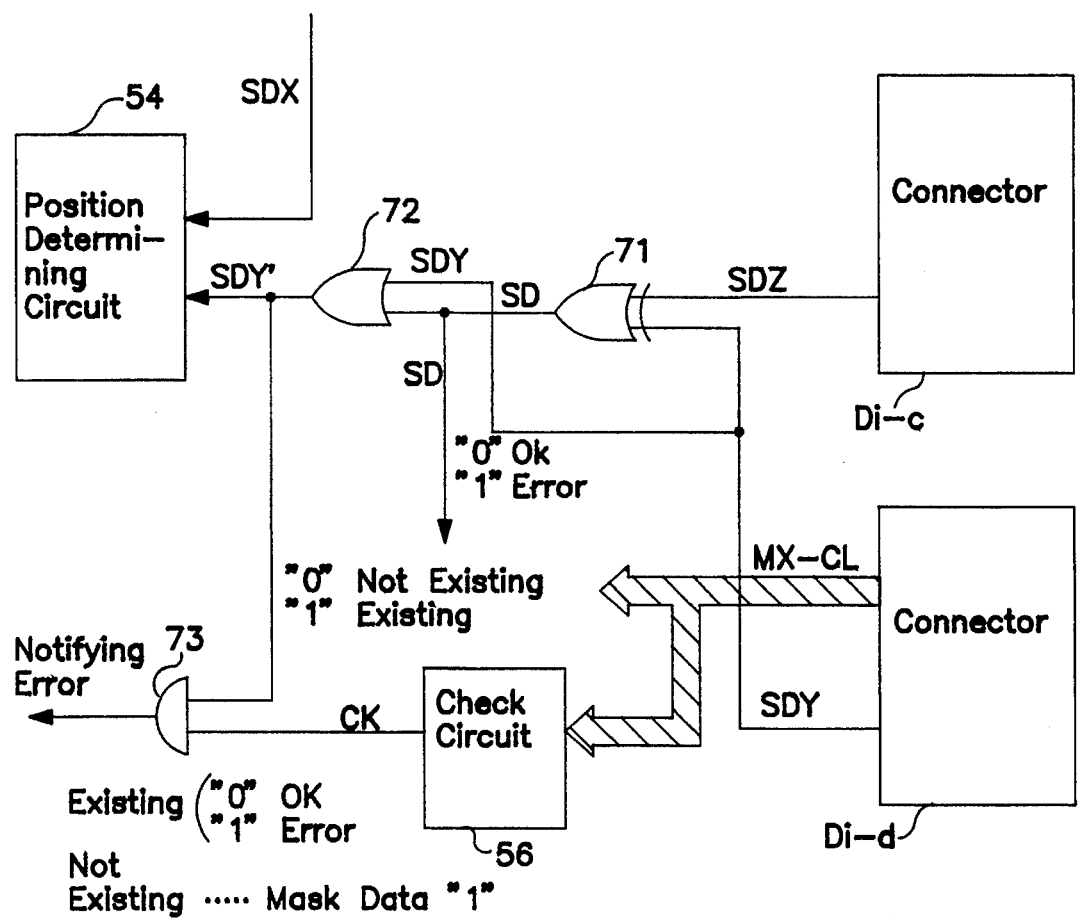
FIG. 11 shows the configuration of the circuit according to the second embodiment.

FIG. 11 shows a part of the circuit configuration according to the second embodiment. The portions similar to those according to the first embodiment are omitted here in FIG. 11 (refer to FIG. 8). Although illustrated in FIG. 11, the portions similar to those according to the first embodiment are numbered or symbolized similarly.

With the configuration shown in FIG. 10, a connection identification signal SDZ can be applied from a downstream terminal unit through signal sending connector Di-c. The configuration includes an exclusive logical sum circuit 71, a logical sum circuit 72, and a logical product circuit 73. Although a check circuit 56 is not shown in FIG. 8, it is also provided for the first embodiment.

In FIG. 11, connection identification signals SDZ and SDY applied from a downstream terminal unit through connectors Di-c and Di-d are applied to the exclusive logical sum circuit 71. The exclusive logical sum circuit 71 sets its own output signal SD to a logical "0" (hereinafter described as "0" simply) if both signals SDZ and SDY indicate "on" (logical "1") or "off" (logical "0"). If one of these signals indicates "0" and the other "1", the circuit sets its own output signal SD to "1".

If both connection identification signals SDZ and SDY applied through connectors Di-c and Di-d indicate "1", then it is determined that the present terminal unit has a terminal unit downstream. If both connection identification signals SDZ and SDY indicate "0", then it is determined that the present terminal unit has no terminal unit downstream. These two cases do not indicate an undesirable state. Therefore, when the output signal SD indicating the above two states and outputted by the exclusive logical sum circuit 71 is "0", it can be determined that the state of connectors Di-c and Di-d is normal.

If either of the above signals SDZ and SDY is "1", then it is determined that one of the connectors Di-c and Di-d is connected to a terminal unit connection cable (the present terminal unit has a terminal unit downstream), and yet the other connector is not connected to the terminal unit connection cable. Therefore, if the output signal SD indicating this state and outputted by the exclusive logical sum circuit 71 is "1", then it is determined that either of the connectors is disconnected from the terminal unit connection cable.

Thus, a user can be notified of a disconnection error between a connector and a terminal unit connection cable by the notification to the software of the above signal SD as an error occurrence information signal when one connector is not connected to a terminal unit connection cable.

Next, an output signal SD of the above described exclusive logical sum circuit 71 is applied to the logical sum circuit 72 together with a connection identification signal SDY applied through the above described connector Di-d. The logical sum circuit 72 sets its own output signal SDY to "0" when both input signals SD and SDY are "0". If one of the signals SD and SDY or both signals indicate "1", then the circuit sets its output signal SDY to "1".

Accordingly, if connector Di-d indicates a normal state, that is, if the present terminal unit has a terminal unit downstream and connectors Di-c and Di-d are connected to a terminal unit connection cable, or if the present terminal unit has a terminal unit downstream and connectors Di-c and Di-d are not connected to a terminal unit connection cable, then an output signal SDY' of the logical sum circuit 72 always indicates the same logic as a connection identification signal SDY. Thus, the position of a present terminal unit can be determined by using a signal SDY+ together with a connection identification signal SDX applied through connector Di-a just as in the first embodiment where a connection identification signals SDY and SDX are used.

Thus, according to the present embodiment, while an error monitoring process is performed to detect a disconnection error between a connector and a terminal unit connection cable, the position of the present terminal unit is determined.

Furthermore, the above described signal SDY' is applied to one input terminal of the logical product circuit 73. A signal CK can be applied from the check circuit 56 to the other input terminal of the logical product circuit 73.

The logical product circuit 73 outputs "1" when the signals applied to both input terminals indicate "1". Otherwise, if either of the signals or both signals applied to the input terminals indicate "0", then the circuit outputs "0".

As described above, the logic of a signal SDY' applied to one input terminal of the logical product 73 is "1" when the present terminal unit has a terminal unit downstream. The check circuit 56 sets a check signal CK to "0" if no errors are detected when it performs a parity check on a data/parity MX-DATA of a cell MD-CL applied from a downstream terminal unit, if any, through connector Di-d, or when it performs a disconnection check on a clock CLK. The check circuit 56 sets the signal to "1" and outputs it if an error has been detected.

Figure 12:
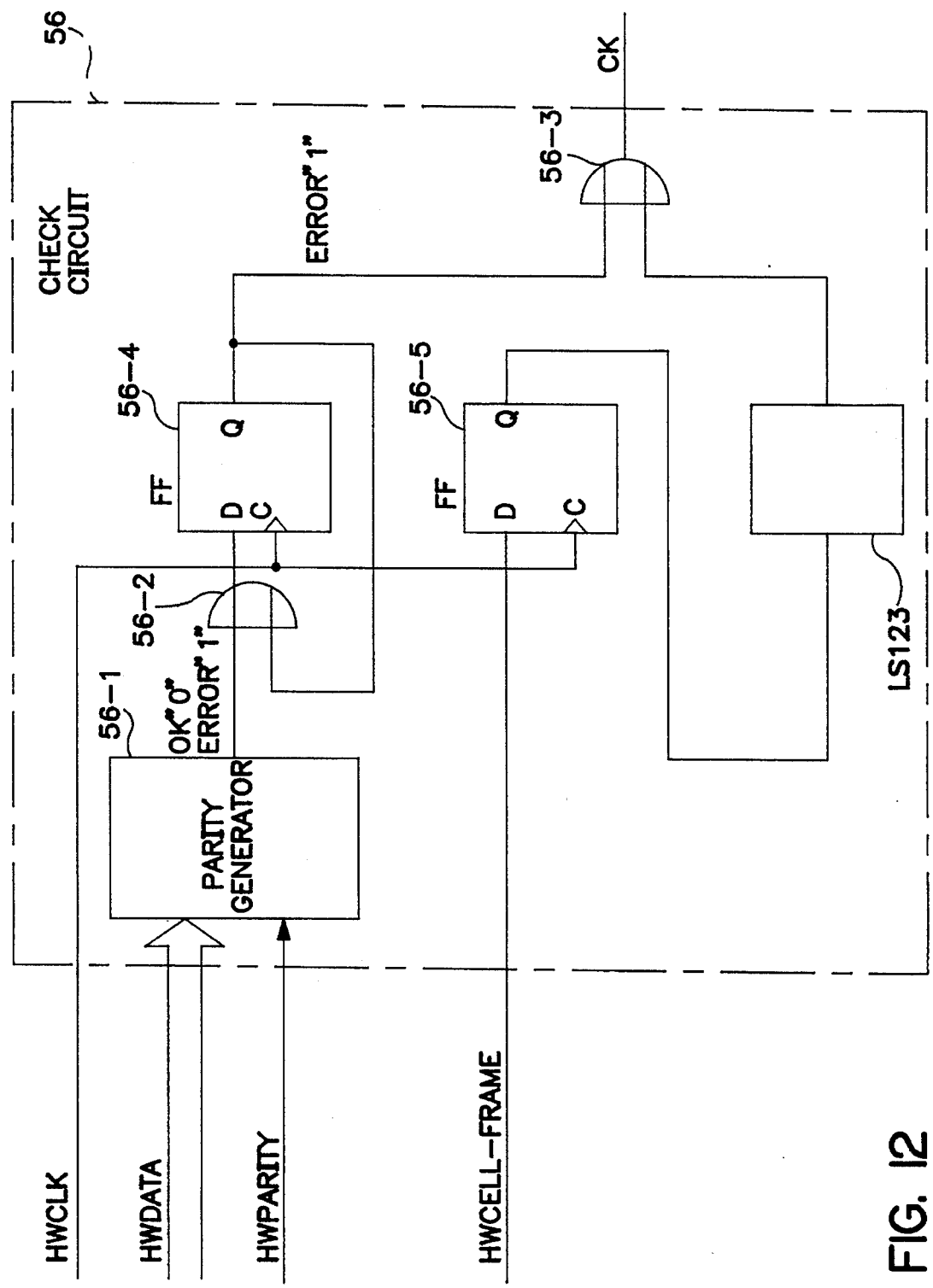
FIG. 12 shows the internal configuration of the check circuit according to the second embodiment.

FIG. 12 shows the configuration of the check circuit 56. The check circuit 56 comprises a parity generator 56-1, an OR circuits 56-2 and 56-3, flipflops 56-4 and 56-5, and a multivibrator LS 123.

As shown in FIG. 11, the check circuit 56 receives a cell MX-CL from the connector Di-d. A clock HWCLK of the cell MX-CL is applied to the clock terminals of the flipflops 56-4 and 56-5, data HWDATA and a parity HWPARITY are applied to the parity generator 56-1, and a cell frame HWCELL-FRAME is applied to the data terminal of the flipflop 56-5.

The parity generator 56-1 performs a parity check and outputs "0" if data are valid and "1" if data are erroneous. The output is applied to the data terminal of the flipflop 56-4 through one input terminal of the OR circuit 56-2, and the output of the flipflop 56-4 is fed back to the other input terminal of the above described OR circuit 56-2, and is applied to another OR circuit 56-3. Accordingly, if the parity generator 56-1 has once outputted "1" indicating an error, then the output of the OR circuit 56-2 is turned to "1". Thus, the output of the flipflop 56-4 is also turned to "1", and fed back to the OR circuit 56-2. As a result, the OR circuit 56-2 continues to output "1" indicating an error regardless of the existence of a parity error for the next and succeeding signals. The result of the parity check is applied to another 0OR circuit 56-3 through the flipflop 56-4.

On the other hand, a cell frame HWCELL-FRAME is struck by the clock HWCLK in the flipflop 56-5, and applied to the multivibrator LS 123. The multivibrator LS 123 monitors the input data, and outputs "0" if the monitoring result is acceptable, and "1" if it refers to an error.

Therefore, in FIG. 11, if the present terminal unit has a terminal unit downstream, then the logical product circuit 73 outputs "1" when the check signal CK is "1" indicating that an error has arisen (input signals to both input terminal units of the logical product circuit 73 indicates "1"). The logical product circuit 73 outputs "0" when the check signal CK is "0" indicating that no error has been detected.

Thus, if the present terminal unit has a terminal unit downstream, a user can be informed of an error of a cell MX-CL such as a parity error of an input signal, a disconnection of a clock CLK, etc. by the notification to the software of the output of the above described logical product circuit 73.

On the other hand, if the present terminal unit has no terminal unit downstream, the logic of a signal SDY' applied to one input terminal of the above described logical product circuit 73 is "0". At this time, the check circuit 56 masks and outputs a predetermined signal of a cell MX-CL, which may have been applied through connector Di-d, in place of a parity check or a disconnection check of a clock CLK. Therefore, if the present terminal unit has no terminal unit downstream and a cell MX-CL is not applied, then a check signal indicates "0". If a cell MX-CL is applied, then a mask-detected "1" is outputted.

Thus, if the present terminal unit has no terminal unit downstream, and a check signal CK indicates "0" informing that no signal has been applied (signals applied to both input terminals of the logical product circuit 73 indicate "0"), then the output of the logical product circuit 73 is "0". If the check signal CK indicates "1" informing that a signal has been input, then the output of the logical product circuit 73 is "1".

Therefore, it is wrongly determined that no downstream terminal unit exists if no connection identification signal SDY is applied from a downstream terminal unit due to the disconnection of connector Di-c and the defective connection of connector Di-d. At this time, only if a cell MX-CL is entered, can it be correctly determined that the determination that no downstream terminal unit exists is wrong, but that the present terminal unit has a terminal unit downstream, and that a connector may be disconnected or defectively connected only.

A user can also be informed not only of an error of a cell MX-CL such as a parity error of an input signal, a disconnection of a clock CLK, etc., but also of an abnormal connection of a connector by notifying the software of the output of the above described logical product circuit 73.

Thus, according to the present embodiment, the connection position of the present terminal unit can be identified, a monitoring operation detects the disconnection of a terminal unit connection cable, and a defective connection between a connector and a terminal unit connection cable is also detected, thereby performing a double monitoring process on possible connection errors of connectors.

What is claimed is:

1. A terminal unit in an ATM switching system, said terminal unit connected serially to one of a communication line switch via switch connecting communication lines and a preceding terminal via a terminal unit communication line, said terminal unit further connected to a succeeding terminal unit and comprising:

upstream input/output means including a first input line, receiving an upstream data signal, and a first output line, connected to one of the communication line switch via said switch connecting communication line and to the preceding terminal unit serially connected via said terminal unit connecting communication line, for receiving and sending a first signal;

downstream input/output means, including a second input line and a second output line, for receiving and sending a second signal, serially connected to the succeeding terminal unit via said terminal unit connecting communication line;

determining means for determining a connection position of the terminal unit in the ATM switching system according to whether a switch connecting signal is added to the upstream data signal, said switch connecting signal indicating whether said communication line switch is connected to the terminal unit, and according to whether a terminal connecting signal is applied to the second input line, said terminal connecting signal indicating whether said succeeding terminal unit is connected to the terminal unit; and output means for selecting a destination of a data sending permission signal b output by the terminal unit according to the connection determined by said determining means.

2. The terminal unit according to claim 1, wherein said determining means determines that the terminal unit is a highest order terminal unit serially connected to said communication line switch after determining that the terminal unit is directly connected to said communication line switch, and after determining that the terminal unit is connected to the succeeding terminal unit.

3. The terminal unit according to claim 1, wherein said determining means determines that the terminal unit is an only terminal unit connected to said communication line switch after determining that the terminal unit is directly connected to said communication line switch, and after determining that the succeeding terminal unit does not exist by not detecting the terminal connecting signal added to the downstream data signal applied to the second input line of said downstream input/output means of the terminal unit, said terminal connecting signal indicating whether the succeeding terminal unit is connected to the terminal unit.

4. The terminal unit according to claim 1, wherein said determining means determines that the terminal unit is an intermediate terminal unit by determining that the terminal unit is connected to the preceding terminal unit by not detecting the switch connecting signal, added to the upstream data signal applied to the first input line said switch connecting signal indicating whether the terminal unit is connected to the line connection switch, and after determining that the terminal unit is connected to the succeeding terminal unit by detecting the terminal connecting signal added to the downstream data signal applied to the second input line, said terminal connecting signal indicating the connection of said succeeding one of said terminal unit.

5. The terminal unit according to claim 1, wherein said determining means determines that the terminal unit is a lowest order terminal unit connected to said communication line switch after determining that the terminal unit is connected to the preceding terminal unit connected to said communication line switch by not detecting the switch connecting signal added to the upstream data signal applied to the first input line and indicating whether the terminal unit is connected to said communication line switch, and after determining that the terminal unit is not connected to said succeeding terminal unit by not detecting the terminal connecting signal added to the downstream data signal applied to the second input line and indicating whether the terminal unit is connected to the succeeding terminal unit.

6. The terminal unit according to claim 1, wherein said determining means monitors whether the second line input and the second output line are normally connected to said terminal unit connecting communication line according to whether the terminal connecting signal applied from the second input line is present, said terminal connecting signal indicating whether the terminal unit is connected to the succeeding terminal unit, and according to whether a signal e applied from the second output line of said downstream input/output means via said terminal unit connecting communication line, said signal e indicating whether said succeeding terminal unit is present.

7. The terminal unit according to claim 1, wherein said output means separates, from the downstream data signal transmitted to said communication line switch, a data sending permission signal b applied together with the downstream data signal transmitted from the succeeding terminal unit to said communication line switch, and returns said signal b to said succeeding terminal unit if said determining means determines that said terminal unit is a highest order terminal unit.

8. The terminal unit according to claim 1, wherein
said output means outputs a data sending permission signal b generated by said terminal unit to a predetermined circuit of said terminal unit if said determining means determines that said terminal unit is an only terminal unit.

9. The terminal unit according to claim 1, wherein
if said determining means determines that said terminal unit is an intermediate terminal unit, said output means transmits to said preceding terminal unit a data sending permission signal b applied together with the downstream data signal sent from said succeeding terminal unit to said communication line switch, together with the downstream data signal obtained by multiplexing a data signal of said terminal unit with said data signal b of the succeeding terminal unit.

10. The terminal unit according to claim 1, wherein
said output means transmits back to said succeeding terminal unit a data sending permission signal b returned from said preceding terminal unit if said determining means determines that said terminal unit is an intermediate terminal unit.

11. The terminal unit according to claim 1, wherein
said output means transmits to said preceding terminal unit a data sending permission signal b returned from said preceding terminal unit together with the downstream data signal sent from said present one of said terminal units to said switch if said determining means determines that said terminal unit is a lowest order terminal unit.

12. The terminal unit according to claim 1, wherein
said output means transmits to said preceding terminal unit a second data sending permission signal b generated by said terminal unit together with the downstream data signal sent from said terminal unit to said communication line switch if said terminal unit is a lowest order terminal unit and a first data sending permission signal b has been lost.

13. A method for connecting terminal units in an ATM switching system, said terminal units comprising at least a present terminal unit, a succeeding terminal unit, and a preceding terminal unit, said present terminal unit being serially connected to the succeeding terminal unit and to one of a communication line switch and the preceding terminal unit, each of the terminal units connected to another of the terminal units via a terminal unit communication line and to the communication line switch via switch connecting communication lines, said method comprising the steps of:

connecting a first output line and a first input line of an upstream input/output means for sending and receiving a first signal, of a highest order terminal unit, said highest order terminal unit being one of the terminal units connected to the communication line switch, to said communication line switch, and connecting a second input line and a second output line of a downstream input/output means for sending and receiving a second signal, of the highest order terminal unit to a first downstream terminal unit, the first downstream terminal unit being one of the terminal units immediately downstream from the highest order terminal unit, to a third output line and a third input line, respectively, of an upstream input/output means for sending and receiving a third signal, of the first downstream terminal unit;

connecting a fourth output line and a fourth input line of an upstream input/output means for sending and receiving a fourth signal, of an intermediate terminal unit, the intermediate terminal unit being one of the terminal units not directly connected to the communication line switch, to a fifth input line and a fifth output line, respectively, of a downstream input/output means for sending and receiving a fifth signal, of a first upstream terminal unit, said first upstream terminal unit being one of the terminal units immediately upstream from the intermediate terminal unit, and a sixth input line and a sixth output line of a downstream input/output means for sending and receiving a sixth signal, of said intermediate terminal unit to a seventh output line and a seventh input line, respectively, of an upstream input/output means for sending and receiving a seventh signal, of a second downstream terminal unit, the second downstream terminal unit being immediately downstream from the intermediate terminal unit; and connecting an eighth input line and an eighth output line of an upstream input/output means for sending and receiving an eighth signal, of a lowest order terminal unit, said lowest order terminal unit being one of the terminal units serially connected to the communication line switch and having no terminal units connected downstream, to a ninth output line and a ninth input line, respectively, of a downstream input/output means for sending and receiving a ninth signal, of a second upstream terminal unit, said second upstream terminal unit being one of the terminal units immediately upstream from the lowest order terminal unit, and not connecting a tenth input line and a tenth output line of a downstream input/output means for sending and receiving a tenth signal, of said lowest order terminal unit.

14. The method for connecting terminal units, as claimed in claim 13, further comprising the steps of:

determining a connection position of one of the terminal units, by a determining means for determining a connection position of the one of the terminal units, with respect to other of the terminal units, said terminal units connected in series with each other, said connection position being determined according to whether a switch connecting signal is added to an upstream data signal applied to an input line of the upstream input/output means for sending and receiving an upstream signal, of the one of the terminal units, said switch connecting signal indicating whether the communication line switch is connected to the one of the terminal units, and according to a terminal connecting signal applied to an input line of the downstream input/output means for sending and receiving a downstream signal, the terminal connecting signal indicating whether the succeeding terminal unit is connected to the one of the terminal units; and selecting a destination, by an output means for selecting a destination, of the one of the terminal units, of a data sending permission signal b one of applied by the one of the terminal units according to the connection position of the one of the terminal units and generated by the one of the terminal units.

* * * * *

UNITED STATES PATENT AND TRADEMARK OFFICE
CERTIFICATE OF CORRECTION

PATENT NO. : 5,524,000

DATED : June 4, 1996

INVENTOR(S) : Shuji YOSHIMURA, et al.

It is certified that error appears in the above-indentified patent and that said Letters Patent is hereby corrected as shown below:

Column 1, line 28, after "switch", insert a comma (",");
    Line 43, after "lines", insert a comma (",");
    Line 54, delete "11" and insert therefor --81--.

Column 4, line 5, after "addition", insert a comma (",").

Column 6, line 27, delete "determines Ti-h" and inser therefor --Ti-h determines--.

Column 7, line 18, after "lines", insert --33,--;
    Line 26, after "lines", insert --33--;
    Line 28, after "3B", delete the comma (",") and insert therefor --and--;
    Line 67, after "cable)", insert --35.--

Column 9, line 5, delete "DS" and insert therefor --D3--.

Column 12, line 35, delete "DS" and insert therefor --D3--.

Column 13, line 52, delete "SDY+" and insert therefor --SDY'--.

UNITED STATES PATENT AND TRADEMARK OFFICE
CERTIFICATE OF CORRECTION

PATENT NO. : 5,524,000
DATED : June 4, 1996
INVENTOR(S) : Shuji Yoshimura, et al.

It is certified that error appears in the above-indentified patent and that said Letters Patent is hereby corrected as shown below:

Column 14, line 37, delete "OOR" and insert therefor —OR—

Signed and Sealed this

Tenth Day of September, 1996

Attest:

BRUCE LEHMAN

*Attesting Officer*          *Commissioner of Patents and Trademarks*